May 1, 1956     E. J. HUNTER     2,743,552
AUTOMATIC IRRIGATION DEVICES
Filed Nov. 22, 1952     2 Sheets-Sheet 1
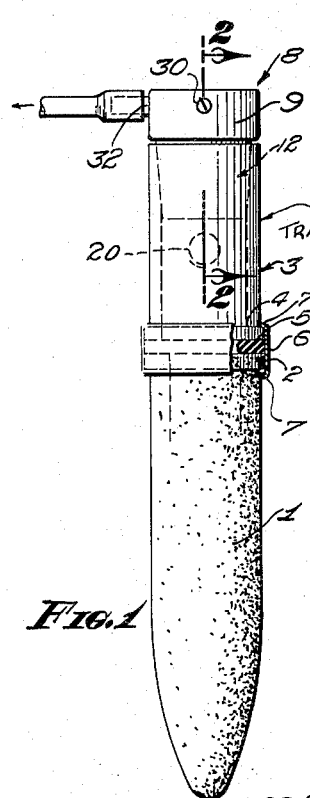
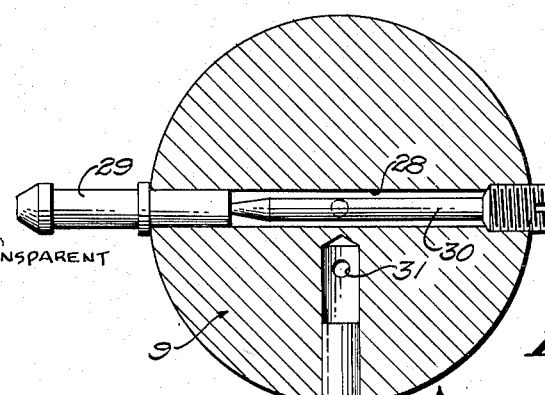
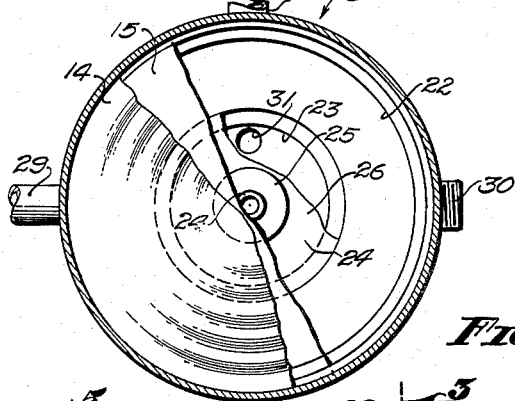
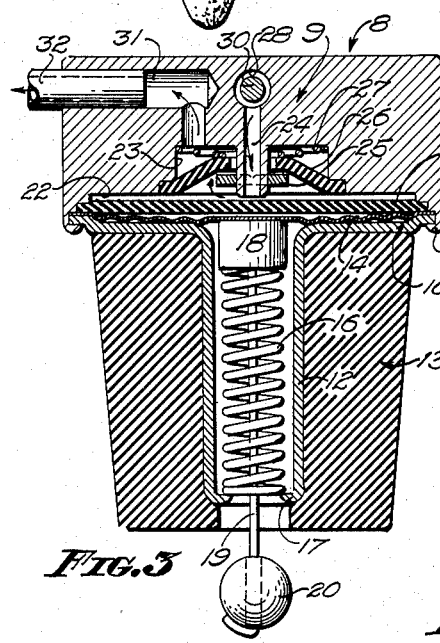
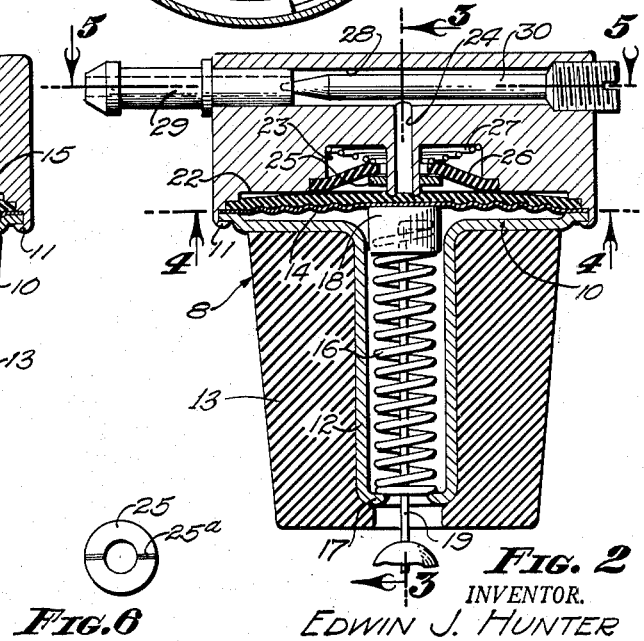
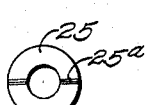
INVENTOR.
EDWIN J. HUNTER
BY Lloyd Spencer
ATTORNEY.

May 1, 1956  E. J. HUNTER  2,743,552
AUTOMATIC IRRIGATION DEVICES
Filed Nov. 22, 1952  2 Sheets-Sheet 2

INVENTOR.
EDWIN J. HUNTER
BY Lloyd Spencer
ATTORNEY

United States Patent Office 2,743,552
Patented May 1, 1956

2,743,552
AUTOMATIC IRRIGATION DEVICES

Edwin J. Hunter, Riverside, Calif.

Application November 22, 1952, Serial No. 322,120

16 Claims. (Cl. 47—1)

My invention relates to automatic irrigation devices; that is, to devices designed to supply water to soil whenever the moisture content of the soil is depleted and to terminate the supply of water when an adequate quantity of water has been delivered to the soil.

Included in the objects of my invention are:

First, to provide an automatic irrigation device which utilizes the phenomena evidenced when a hollow, water filled sealed ceramic cell is buried in wetting contact with soil; namely, under such conditions, the pressure of the water in the cell equals atmospheric pressure when the soil is wetted to field capacity, but drops, producing a vacuum pressure in the cell as the soil moisture is depleted, the degree of vacuum pressure thus reflecting the soil moisture content.

Second, to provide a particularly compact automatic irrigation device which employs a ceramic cell, closed at its lower end; a transparent tube communicating with the cell, and a vacuum sensitive valve structure incorporating a plug which closes and seals the transparent tube.

Third, to provide an automatic irrigation device wherein the valve structure is so arranged as to open at a predetermined maximum vacuum condition within the ceramic cell, reflecting a depleted water condition in the soil, and then remains open until the vacuum has been substantially relieved by the supply of water to the soil.

Fourth, to provide an automatic irrigation device wherein the valve structure may be manually operated when desired so as to facilitate regulation of its flow rate or to provide a convenient source of water to replenish any depletion of water in said ceramic cell.

Fifth, to provide in an automatic irrigation device, a particularly compact vacuum operated valve structure utilizing a spring loaded vacuum sensitive diaphragm, the diaphragm having an initial or normal position wherein the diaphragm under urge of said spring seals a water inlet of small diameter and the water pressure is confined substantially to the area of the inlet, so that a substantial vacuum force is required to overcome the spring and open the inlet; the valve structure also utilizing a back pressure valve element controlling the valve outlet so that once the inlet is open the entire diaphragm is subjected to a back pressure which exerts a predetermined force against the spring to hold the inlet open until the vacuum pressure is substantially relieved. Thus the valve structure is so arranged that the vacuum force required to open the valve is substantially greater than the vacuum force required to close the valve.

Sixth, to provide in an automatic irrigation device a valve structure which, although subjected to gradually varying conditions, snaps open or closed quickly without flutter, vibration, or in any way creating a water hammer.

Seventh, to provide in an automatic irrigation device, a vacuum responsive valve structure which is so arranged that the vacuum pressure required to open the valve is inversely proportional to the line pressure of the water supply; that is, under conditions of low line pressure a greater vacuum pressure must be exerted to open the valve, and under conditions of high line pressure a lesser vacuum pressure will open the valve. Consequently, the automatic irrigation device tends to operate under conditions of high line pressure (when the supply of water is most available) and tends to defer operation under conditions of low line pressure; thus, placing a minimum burden on the water supply.

With the above and objects in view, reference is directed to the accompanying drawing, in which Figure 1 is an elevational view of my automatic irrigation device.

Figure 2 is an enlarged sectional view thereof taken through 2—2 of Fig. 1, showing the vacuum operated valve structure in its closed condition.

Figure 3 is a similar sectional view showing the valve structure in its open condition.

Figure 4 is a transverse sectional view thereof through 4—4 of Figure 2.

Figure 5 is another transverse sectional view thereof through 5—5 of Figure 2.

Figure 6 is an elevational view of the back pressure valve flange.

Figure 7:
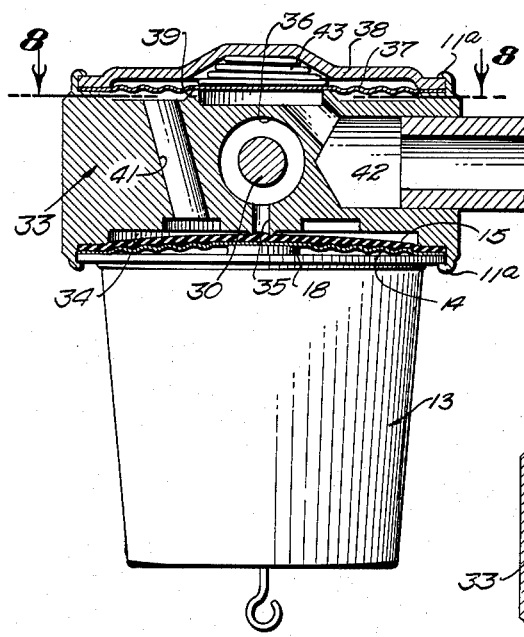
Figure 7 is a partial sectional, partial elevational view of a modified form of my irrigation valve structure.

My automatic irrigation device includes a ceramic cell 1. The ceramic cell is in the form of a tube tapered and closed at one end and provided with a flange 2 at its other end. A transparent inspection tube 3 having a flange 4 is disposed with its flange adjacent the flange 2. A seal ring 5 is interposed between the flanges 2 and 4. An annular clamp ring 6 embraces the flanges 2 and 4, as well as the seal ring 5. The seal ring is compressed between the flanges by internal lips 7 formed at the axial extremities of the clamp ring 6.

The extended end of the inspection tube 3 receives a valve structure 8. The valve structure includes a body member 9 in the form of a cylinder of short, axial dimension. One side of the body 9 is provided with a cover disc 10, secured in place by a marginal clamp lip 11. The cover disc is provided with a hollow stem 12 surrounded by a tapered plug 13 of rubber or similar yieldable material. The plug 13 fits within and seals the extended end of the inspection tube 3.

Interposed between the cover disc 10 and the body member 9 is a diaphragm 14 and a seal disc 15. The diaphragm is provided with annular corrugations and lies adjacent to the cover disc 10.

The hollow stem 12 receives a spring 16 which is retained therein by an internal flange 17 formed at the extremity of the hollow stem. The inner end of the spring 16, adjacent to the diaphragm 14 is provided with an end piece 18 formed by casting a small cylinder of low melting alloy around the end of the spring. A pull wire 19 extends from the end piece 18 through the stem 12 and plug 13 and is threaded into a bead 20.

The end of the body member 9 adjacent to the cover disc 10 is provided with a stepped cavity forming an inlet chamber 22, confronting the seal disc 15, and an outlet chamber 23 of smaller diameter centered in the inlet chamber. An inlet nozzle 24 projects through the outlet chamber and terminates in contiguous relation with the seal disc 15. Adjacent to its extremity the inlet nozzle is provided with a flange 25 press fitted thereon. A back pressure valve disc 26, having a central aperture, is fitted around the inlet nozzle so that the margins of the aperture bear yieldably against the flange 25. The outer margin of the disc 26 rests against the periphery of the outlet chamber 23, so that the disc forms a partition between the inlet chamber and outlet chamber. A spring 27 may be employed to urge the valve disc 26 against the inlet nozzle flange 25; however the valve disc will function without the spring inasmuch as the inherent resilience of the material comprising the valve disc is sufficient to maintain the disc seated against the inlet nozzle flange.

As will be brought out hereinafter, it is desirable that the valve disc 26 "leak" slightly. This is accomplished by one or more nicks or grooves 25a in the flange 25 as shown in Figure 6.

The body member 9 is provided with a diametrically extending inlet passage 28. One end of the inlet passage is provided with a tubular inlet fitting 29 which protrudes therefrom to receive a small hose, not shown. The opposite end of the inlet passage receives the screw-threaded end of a needle valve 30 which cooperates with the inlet fitting 29 to regulate the flow of water from the inlet fitting. The bore of the inlet nozzle 24 intersects the inlet passage 28.

An outlet port 31 communicates with the outlet chamber 23. This port extends axially from the outlet chamber and then radially from the body member 9, and is equipped with an outlet fitting 32 adapted to receive a small hose as shown in Figure 1.

Operation of my automatic irrigation device is as follows:

The ceramic cell and inspection tube is completely filled with water and the ceramic cell is buried in soil adjacent to the plant or plants to be irrigated. The ceramic cell is porous so that moisture transfer may occur between water within the cell and moisture within the surrounding soil. Before insertion of the plug, water to fill the ceramic cell may be supplied through the valve structure by pulling manually on the bead 20 to relieve the initial tension of the seal disc 15 against the inlet nozzle 24.

After the inspection tube and ceramic cell has been filled with water the plug 13 is inserted so as to form therewith a sealed chamber. Initially, the valve structure is in the condition shown in Fig. 2 in which the valve inlet nozzle is closed due to the pressure exerted by the spring 16. Upon depletion of water from the soil a vacuum pressure is established in the ceramic cell 1. While such vacuum pressure may be as high as eighteen to twenty-four inches of mercury, it is not necessary to operate in this range; a vacuum pressure of eight to twelve inches being sufficient. When a vacuum pressure of sufficient magnitude to overcome the force of the spring 16 is established, the diaphragm and seal disc is forced away from the inlet nozzle by the inlet pressure so that the condition shown in Fig. 3 obtains. In order for the water to flow from the inlet chamber, sufficient back pressure must be created to lift the back pressure valve disc 26. This back pressure is exerted over the entire area of the diaphragm 14 and augments the force exerted by the inlet pressure. Consequently, the vacuum pressure must be substantially relieved before the inlet nozzle is again closed.

When the valve is in operation its cavities are filled with water. If the back pressure valve disc 26 provided a tight seal, vacuum force exerted on the diaphragm 14 would have to overcome the resistance of the valve disc 26 and move its outer periphery from its seat. This would substantially increase the vacuum pressure required to open the valve, particularly if the valve has sat idle for some time. Another condition can occur. Immediately upon closing the valve, the water between the diaphragm 15 and the disc 26 is momentarily under pressure which tends to reopen the valve; so that instead of requiring any excessive vacuum pressure, the valve is ready to open on the slightest increase in vacuum pressure.

Both of these conditions are avoided by permitting the valve disc 26 to leak, this being accomplished by nicking or grooving the flange 25. To illustrate, on a valve of the size shown in Fig. 1 a nick approximately .003 by .005 inch deep is sufficient to permit proper bleeding without otherwise affecting the operation of the valve disc. Thus, the valve disc functions both as a back pressure valve and as a relief valve.

Figure 8:
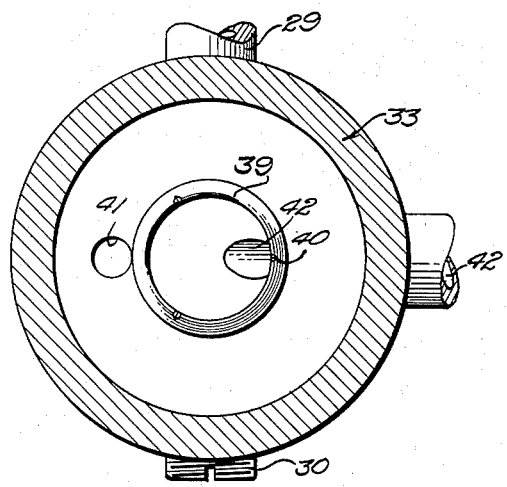
Figure 8 is a transverse sectional view thereof taken through 8—8 of Figure 7.

Reference is now directed to Figs. 7 and 8. In the construction here shown the back pressure-relief valve is disposed on the top or opposite side of the valve body from the vacuum diaphragm. The valve body 33 is provided at its under side with a cover disc, diaphragm 14 and seal disc 15 as in the first described structure. Above the seal disc 15 there is formed an inlet chamber 34 intersected by a central inlet nozzle 35 engaged by the disc 15.

The inlet nozzle 35 communicates with a transverse inlet passage 36 having a needle valve 30.

The top side of the valve body 33 is provided with a recess covered by a diaphragm 37 which functions as a back pressure-relief valve and which may be similar to the diaphragm 14. A cover disc 38 holds the diaphragm in place and is peripherally sealed by a marginal lip 11a. Centered in the recess covered by the diaphragm 37 is a raised valve seat 39 engageable by the diaphragm 37 and notched to provide a bleed port 40. The recess externally of the valve seat communicates with the inlet chamber 34 through a passage 41. The interior of the seat 39 communicates with an outlet port 42. The annular space surrounding the seat 39 thus forms a part of the inlet chamber 34 whereas the interior of the seat defines the outlet chamber.

Operation of the valve construction shown in Fig. 7 is essentially the same as in the first described construction. When the vacuum pressure under the diaphragm 14 reaches a predetermined value, the inlet valve opens. Back pressure determined by the force required to open diaphragm 37 is maintained on the diaphragm 14. On closing of the inlet valve, this pressure is relieved through the bleed port 40.

The diaphragm 37 is shown as form of metal; however it may be of yieldable material such as rubber, or covered by a disc similar to the disc 15. Still further, a spring 43 may augment the normal force of the diaphragm.

Figure 9:
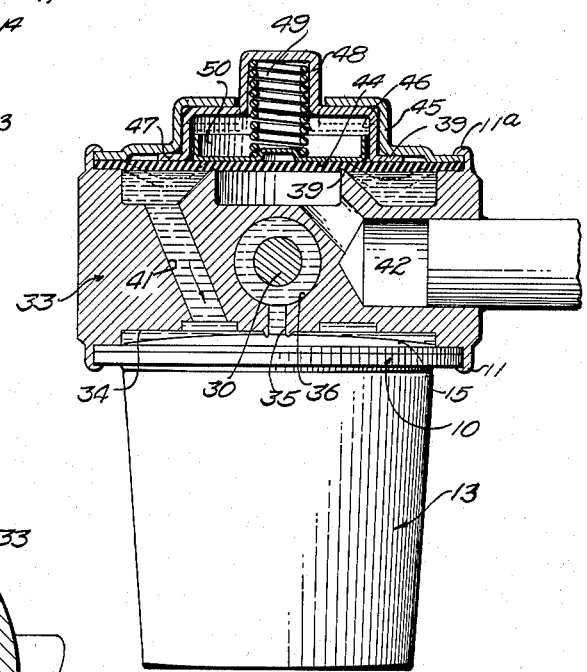
Figure 9 is a partial sectional, partial elevational view of a further modified form of my irrigation valve structure.

Reference is now directed to Fig. 9. The arrangement here shown functions similarly to the arrangement shown in Figs. 7 and 8 with the additional feature of a manual control so that the valve may be operated without removing it from the sight tube 3. In this construction the diaphragm 37 is replaced by a rubber or rubber-like diaphragm 44 and a centrally perforated cover disc 45 is substituted for the cover 38. The central portion of the cover disc 45 is cupped to receive a plunger 46 which is likewise cup shaped and having a flange 47 which rests on the diaphragm 44 outwardly from the valve seat 39. The plunger 46 has a central hollow boss 48 which protrudes through the central aperture of the cover disc 45 to form a push button. A spring 49 and a load distributing washer 50 is interposed between the plunger 46 and the diaphragm 44.

Automatic operation of the arrangement shown in Fig. 9 is the same as the previously described constructions. In this connection, it should be noted that the plunger flange 47 is sufficiently spaced from the valve seat 39 to permit the diaphragm to function as a back pressure valve.

When it is desired to operate the valve manually, the push button 48 is depressed. The water filling the space between the diaphragm 44 and disc 15 transmits this force to the diaphragm 14 opening the inlet port or nozzle. Although the diaphragm 44 may be stretched slightly under this condition, the normal line pressure is sufficient to lift the central portion of the diaphragm and permit flow. Of course if the valve is manually operated just before conditions for automatic operation obtain, the valve will go through its automatic cycle of operation before closing again.

It should be observed that the line pressure has a beneficial effect on the opening conditions of the vacuum valve. Under conditions of high line pressure, this pressure exerted on the center of the diaphragm, tends to open the valve at a lesser vacuum pressure; whereas, under conditions of low line pressure, a greater vacuum pressure is required. The result is, that the valve tends to delay its operation if the line pressure is low and to hasten its operation if the line pressure is high. This has substantial advantage for a condition of low line pressure indicates an excessive demand on the water supply, and it is less desirable that the automatic irrigation should increase that demand; whereas under a condition of high line pressure, when the supply of water is adequate, it becomes most desirable that automatic irrigation occur.

It will thus be observed that the automatic irrigation device may be designed to permit depletion of the moisture from the soil to a predetermined extent and then supply moisture until the soil approaches saturation or field capacity. Thus a wet and dry cycle essential to proper growth of most plants can be maintained automatically.

Although I have shown and described a particular embodiment of my invention I do not wish to be limited thereto but desire to include within the scope of my invention the novelty inherent in the appended claims.

I claim:

1. An automatic irrigation device, comprising a hollow, ceramic cell closed at its lower end; a transparent inspection tube extending from said cell; a valve structure including a body, a hollow stem extending therefrom, a yieldable plug surrounding said stem and arranged to be inserted in said inspection tube to form with said tube and ceramic cell a sealed chamber adapted to be filled with water; said valve structure having a water inlet and outlet and a diaphragm isolating said valve structure from said sealed chamber, said diaphragm being sensitive to vacuum pressures within said chamber applied thereon through said hollow stem for controlling flow through said valve structure.

2. An automatic irrigation device, comprising: a hollow, ceramic cell closed at its lower end; a transparent inspection tube extending from said cell; a valve structure including a body, a hollow stem extending therefrom, a yieldable plug surrounding said stem and arranged to be inserted in said inspection tube to form with said tube and ceramic cell a sealed chamber adapted to be filled with water; said valve structure including a water inlet and outlet, a diaphragm controlling said inlet and exposed through said stem to vacuum pressures within said chamber, a spring in said stem urging said diaphragm toward a position to close said inlet; and means for manual operation of said valve structure.

3. A vacuum sensitive valve structure for automatic irrigation devices, comprising: a body member defining a cavity and including an inlet port directed into said cavity and an outlet leading therefrom; a diaphragm forming a wall of said cavity and disposed to control flow therein through said inlet port; means urging said diaphragm to close said inlet port, said diaphragm being sensitive to vacuum pressure on its side opposite from said inlet port to open said port against the urging of said means, the area of said diaphragm subjected to fluid pressure when said inlet port is closed being less than the area so subjected when said inlet port is open; and a back pressure valve element controlling flow from said cavity to said outlet tending to maintain a predetermined fluid pressure on said diaphragm upon opening of said inlet port to augment the vacuum pressure thereon, whereby a greater vacuum pressure is required to open said inlet port than is required to maintain it open.

4. A vacuum sensitive valve structure for automatic irrigation devices, comprising: a body member defining a cavity and including an inlet nozzle projecting into said cavity and an outlet port leading from said cavity; a yieldable partition surrounding said inlet nozzle and dividing said cavity into an inlet chamber and an outlet chamber; said partition forming a back pressure valve tending, on flow of water from said inlet to said outlet, to maintain a predetermined back pressure in said inlet chamber; a diaphragm forming a wall of said inlet chamber and confronting said inlet nozzle; and yieldable means urging said diaphragm to close said inlet nozzle, the side of said diaphragm opposite from said inlet chamber adapted to be subjected to vacuum pressure of predetermined magnitude to open said inlet nozzle, said diaphragm thereupon tending to remain open in response to the back pressure in said inlet chamber until said vacuum pressure is substantially relieved.

5. A vacuum sensitive valve structure for automatic irrigation devices, comprising: means defining an inlet chamber including a diaphragm wall; an inlet port confronting said diaphragm wall, said diaphragm wall normally closing said inlet port and yieldable upon formation of vacuum pressure at its side opposite from said inlet port to open said inlet port; and means defining an outlet chamber having an outlet port and including a yieldable partition separating and controlling flow of water from said inlet chamber to said outlet chamber and tending to maintain a back pressure on said diaphragm augmenting the opening pressure thereon upon opening of said inlet port thereby to maintain said inlet port open until said vacuum pressure is substantially relieved.

6. A vacuum sensitive valve structure for automatic irrigation devices, comprising: a body member defining a cavity and including an inlet nozzle projecting into said cavity and an outlet port leading from said cavity; a yieldable partition surrounding said inlet nozzle and dividing said cavity into an inlet chamber and an outlet chamber; said partition forming a back pressure valve tending to maintain a back pressure in said inlet chamber on flow of fluid from said inlet nozzle to said outlet port; a diaphragm forming a wall of said inlet chamber; and a yieldable means urging said diaphragm to close said inlet nozzle, said diaphragm being sensitive to vacuum pressures exerted on the side thereof opposite from said inlet chamber to open said inlet nozzle, the area of said diaphragm subjected to fluid pressure being less when said inlet nozzle is closed than when said inlet nozzle is open, whereby upon opening of said inlet nozzle the back pressure in said inlet chamber augments the opening pressure to maintain said inlet port open until said vacuum pressure is substantially relieved.

7. A vacuum sensitive valve structure for automatic irrigation devices, comprising: a body member defining a cavity and including an inlet nozzle projecting into said cavity and having a flanged end and an outlet port at one side of said inlet nozzle; a yieldable partition surrounding said inlet nozzle and dividing said cavity into an inlet chamber and an outlet chamber, said partition cooperating with the flanged end of said inlet nozzle to form a back pressure valve permitting flow from said inlet chamber to said outlet chamber while tending to maintain, during flow from said inlet nozzle to said outlet port a predetermined back pressure in said inlet chamber; a diaphragm forming a wall of said inlet chamber, its inner side confronting and normally closing said inlet nozzle, said diaphragm being sensitive to vacuum pressures on its outer side to open said inlet port, the back pressure maintained in said inlet chamber augmenting the opening pressure thereby to hold said inlet nozzle open until said vacuum pressure is substantially relieved.

8. An automatic irrigation device, comprising: a hollow, ceramic cell closed at its lower end; a transparent inspection tube extending from said cell; body member having a cavity in one side, an inlet port and outlet port communicating therewith, a cover closing said cavity and having a hollow stem; a diaphragm interposed between said cover and said cavity to form a wall for said cavity, said diaphragm movable to open and close said inlet port;

a spring in said stem bearing against said diaphragm urging said diaphragm to close said port; means for manually opening said inlet nozzle; and a plug surrounding said stem for insertion in said inspection tube to form with said tube and ceramic cell a sealed chamber adapted to be filled with water, said diaphragm being formed to make a portion of the walls of said sealed chamber and thereby subjected to such vacuum pressures as may be established therein.

9. A vacuum pressure control valve for automatic irrigation devices, comprising: a body member having a stepped cavity in one side forming an inner smaller outlet chamber and an outer larger inlet chamber, an inlet nozzle projecting through said outlet chamber and into said inlet chamber; a back pressure valve disk surrounding said inlet nozzle and separating said outlet chamber from said inlet chamber; said valve disk operable to admit water from said inlet chamber to said outlet chamber and, during flow of water, to maintain a back pressure in said inlet chamber; and a diaphragm closing said inlet chamber confronting said inlet nozzle and normally closing said inlet nozzle, said diaphragm adapted to be subjected to vacuum pressure on the side thereof opposite from said inlet nozzle to open said inlet nozzle, said diaphragm having a smaller pressure area when said inlet valve is closed and a larger pressure area subjected to back pressure when said back pressure valve disk is open, whereby when once opened said inlet nozzle tends to remain open until vacuum pressure on said diaphragm is substantially relieved.

10. A vacuum pressure control valve for automatic irrigation devices, comprising: a body member having a stepped cavity in one side forming an inner smaller outlet chamber and an outer larger inlet chamber, an inlet nozzle projecting through said outlet chamber and into said inlet chamber; said body member having an inlet passage extending diametrically with respect to said cavity and communicating with said inlet nozzle, and an outlet nozzle extending radially with respect to said cavity and communicating with said outlet chamber; a meter valve in said inlet passage to control the rate of water supply to said inlet nozzle; a back pressure valve disk surrounding said inlet nozzle and separating said outlet chamber from said inlet chamber, said valve disk operable to admit water from said inlet chamber to said outlet chamber and, during flow of water, to maintain a back pressure in said inlet chamber; and a diaphragm closing said inlet chamber confronting said inlet nozzle and normally closing said inlet nozzle, said diaphragm adapted to be subjected to vacuum pressure on the side thereof opposite from said inlet nozzle to open said inlet nozzle, said diaphragm having a smaller pressure area when said inlet valve is closed and a larger pressure area subjected to back pressure when said back pressure valve disk is open, whereby when once opened said inlet nozzle tends to remain open until vacuum pressure on said diaphragm is substantially relieved.

11. An automatic irrigation device comprising: a body member having a stepped cavity in one side to form an inner smaller outlet chamber and an outer larger inlet chamber, an inlet nozzle projecting through said outlet chamber and into said inlet chamber; a back pressure valve disk surrounding said inlet nozzle and separating said outlet chamber from said inlet chamber, said valve disk operable to admit water from said inlet chamber to said outlet chamber and, during flow of water, to maintain a back pressure in said inlet chamber; a diaphragm closing said inlet chamber and confronting said inlet nozzle; a cover disk secured to said body member and overlying said diaphragm; a hollow stem extending from said cover disk; a spring in said stem engageable with said diaphragm to urge said diaphragm to close said inlet valve; a seal plug surrounding said stem; and a hollow, porous ceramic cell adapted to be filled with water and closed by said seal plug whereby said diaphragm is exposed through said stem to such vacuum pressure as may be established in said cell, and movable in response to such vacuum pressures to open said inlet nozzle in opposition to the urge of said spring; said diaphragm having a small pressure area when said inlet nozzle is closed and a larger pressure area subjected to back pressure when said back pressure valve disk is open, whereby when once opened, said inlet nozzle tends to remain open until the vacuum pressure in said cell is substantially relieved.

12. A vacuum pressure control valve for automatic irrigation devices, comprising: a valve body defining an inlet chamber, an outlet chamber, and an inlet port in said inlet chamber; a diaphragm forming a wall of said inlet chamber and confronting said inlet port to close the same, the area of said diaphragm within the boundaries of said inlet port being subjected to the line pressure of water supplied therethrough, the opposite side of said diaphragm adapted to be subjected to variable vacuum pressures, such line pressure urging said diaphragm to its open position whereby, under conditions of high line pressure, less vacuum pressure is required to open said inlet port than under conditions of low line pressure; a back pressure and relief valve device to control flow of water from said inlet chamber to said outlet chamber, said valve device tending on opening of said inlet port, to maintain a back pressure on said diaphragm thereby to hold said inlet open until said vacuum pressure is substantially relieved, and on closing of said inlet port to bleed such back pressure from said diaphragm.

13. A vacuum sensitive valve structure for automatic irrigation devices, comprising: a body member defining an inlet cavity including an inlet nozzle projecting into said inlet cavity, an outlet cavity including an outlet port therein, and a passage connecting said cavities; an inlet diaphragm covering said inlet cavity and disposed so as to control communication between said inlet nozzle and said inlet cavity, said diaphragm being exposed to vacuum pressures and responsive thereto to open said inlet nozzle and an outlet diaphragm covering said outlet cavity and disposed so as to control communication between said outlet cavity and said outlet port, said outlet diaphragm adapted on flow of water through said outlet port to maintain a back pressure on said inlet diaphragm thereby tending to maintain said inlet port open until the vacuum pressure on said inlet diaphragm is substantially relieved; and means providing a bleed path around said outlet diaphragm to relieve said back pressure on closing of said inlet port.

14. A vacuum sensitive valve structure for automatic irrigation devices as set forth in claim 13 which further includes: a manually operable means for opening said inlet port, including a member engageable with said outlet diaphragm to displace water present between said diaphragms thereby to force the inlet diaphragm from said inlet port.

15. A vacuum pressure control valve for automatic irrigation devices as set forth in claim 12 wherein: said outlet chamber is a recess in said inlet chamber; said inlet port is in the form of a stem depending in said outlet chamber and flanged at its extremity; and said relief valve device includes a disk surrounding said stem, engaging said flange and separating said outlet chamber from said inlet chamber.

16. A vacuum pressure control valve for automatic irrigation devices as set forth in claim 12 wherein: said outlet chamber is connected to said inlet chamber by a passage and includes an outlet port; and said valve device includes a diaphragm forming a wall for said outlet chamber and disposed to control flow to said outlet port.

References Cited in the file of this patent
UNITED STATES PATENTS

| | | |
|---|---|---|
| 1,505,217 | Powell | Aug. 19, 1924 |
| 1,998,761 | Hueber | Apr. 23, 1935 |
| 2,212,486 | Zoder | Aug. 20, 1940 |
| 2,445,717 | Richards | July 20, 1948 |